Dec. 7, 1954
C. R. EVANS
2,696,602
COMPENSATED MAGNETOMETER
Filed July 6, 1944
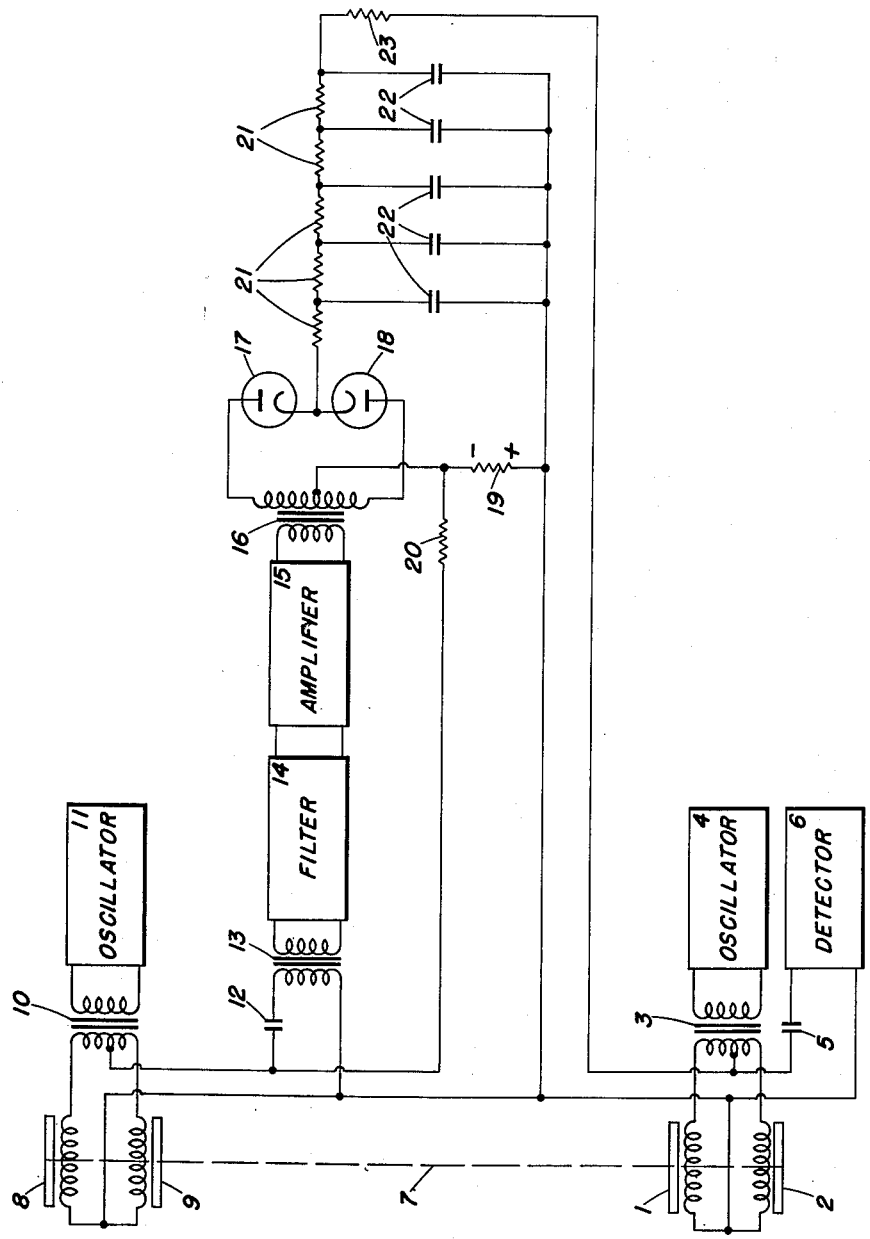
Inventor
C. RICHARD EVANS
By
P. Schmitt
Walter S. Pawl.
Attorney 2,696,602

COMPENSATED MAGNETOMETER

Chauncey Richard Evans, Salt Lake City, Utah, assignor to the United States of America as represented by the Secretary of the Navy Application July 6, 1944, Serial No. 543,700

3 Claims. (Cl. 340—197)

This invention relates to an improved magnetometer for measuring magnetic fields, and more particularly to a magnetometer which is especially adapted for use in measuring relatively rapid changes in a magnetic field. Such changes may be referred to as magnetic anomalies.

Magnetometers of the type employing a magnetic core having relatively high permeability have been proposed in the past for the purpose of measuring either the absolute value of or small changes in a magnetic field. In such magnetometers, it is common practice to provide means for compensating, either partially or entirely, for the earth's magnetic field. The reason for employing such compensation was to render the magnetometer as sensitive as possible to small changes in the magnetic field. In a given magnetometer, the compensation is adjusted to provide a desired ambient magnetic field, the value of this field being selected so that the magnetometer operates at or near its most sensitive condition.

Magnetometers of the general type described above were entirely satisfactory in those instances where the changes in the earth's magnetic field either were relatively small or took place at a very slow rate compared with that of the magnetic anomalies under observation so that manual compensation was satisfactory. In practice, however, such magnetometers were relatively unsatisfactory in coping with the large changes in the earth's magnetic field frequently encountered in certain applications of such magnetometers.

It is an object of the present invention, therefore, to provide an improved compensated magnetometer which is especially adapted for use in those applications where the fluctuations of the earth's magnetic field are both large and relatively rapid. The improved magnetometer of the present invention includes means which function automatically to provide a substantially optimum degree of compensation regardless of wide variations in the earth's magnetic field. In this way, the magnetometer provides at all times substantially maximum sensitivity to the magnetic anomalies under observation.

While the improved magnetometer here disclosed is adapted for use in any magnetometer of the type which employs a magnetic core having relatively high permeability, its operation is particularly advantageous in conjunction with the unbalanced magnetometer described in copending application Serial No. 516,612, filed January 1, 1944, Unbalanced Magnetometers, Otto H. Schmitt, now Patent No. 2,560,132, issued July 10, 1951, together with the detection system described in copending application Serial No. 531,624, filed April 18, 1944, Detection Systems, Otto H. Schmitt.

In accordance with the present invention, a first magnetometer is provided which is responsive to relatively rapid changes in a magnetic field. Means are also provided for substantially overcoming the effect on the response of this magnetometer of relatively slow changes in the magnetic field. This means comprises a second magnetometer which receives both ambient and rapid changes in the magnetic field. The latter changes are compensated for in the second magnetometer by feeding a portion of the second magnetometer output back to said second magnetometer, thus rendering it responsive only to the ambient changes. Appropriate connections are provided for applying the compensated output of the second magnetometer to the first magnetometer. It will be apparent, therefore, that the degree of compensation which is applied to the main magnetometer is regulated automatically by means of an auxiliary magnetometer which is rendered responsive only to slow changes in the magnetic field. By proper design, as disclosed herein, it is possible almost completely to overcome the effects of relatively slow changes in the magnetic field upon the sensitivity of the main magnetometer to magnetic anomalies.

For a better understanding of the invention, together with other and further objects thereof, reference is made to the following description taken in connection with the accompanying drawing, and its scope will be pointed out in the appended claims.

In the accompanying drawing, the single figure is a circuit diagram of a compensated magnetometer in accordance with the present invention.

Referring now to the single figure of the drawing, there is shown a pair of magnetometer elements 1 and 2 which are driven, through transformer 3, by oscillator 4. The signal output of magnetometer elements 1 and 2 is supplied through capacitor 5 to detector 6.

Mechanically coupled with magnetometer elements 1 and 2, as indicated by dotted line 7, is a second pair of magnetometer elements 8 and 9. Elements 8 and 9 are driven, through transformer 10, by oscillator 11. The signal output of magnetometer elements 8 and 9 is supplied, through capacitor 12, transformer 13, second-harmonic filter 14, amplifier 15 and transformer 16, to a full-wave rectifier comprising vacuum tubes 17 and 18. An instantaneous voltage corresponding to the rectified output of magnetometer elements 8 and 9 appears across resistor 19 with the polarity indicated. This voltage is applied, through resistor 20, to magnetometer elements 8 and 9 to provide compensation for these elements.

The output of vacuum tubes 17 and 18 is also applied, after being subjected to time delay by the filter network comprising series resistors 21 and shunt capacitors 22, through resistor 23 to magnetometer elements 1 and 2. This voltage provides compensation for these elements which does not vary appreciably with relatively rapid magnetic anomalies but which does follow the relatively slow changes in the magnetic field. It is to be noted that shunt capacitors 22, in addition to their function as a portion of the time-delay filter, also serve to provide a path of relatively low impedance for the current which flows through resistor 19.

In operation, magnetometer elements 1 and 2 respond to magnetic anomalies in the usual manner, to provide an output signal which is rendered usable by detector 6. By virtue of the mechanical link with elements 1 and 2, magnetometer elements 8 and 9 are subjected to the same magnetic field. The output signal from these elements, instead of being used for observation, is utilized to provide appropriate compensation for both sets of elements. The compensation provided for elements 8 and 9 follows changes in the ambient magnetic field practically instantaneously, and thereby maintains these elements in a condition such that they are most receptive to further changes in the magnetic field. The compensation which is supplied to magnetometer elements 1 and 2, on the other hand, is such that they remain most sensitive to magnetic anomalies regardless of the strength of the ambient field.

It will be understood that various changes and modifications may be made in the arrangement shown and described without departing from the invention. For example, magnetometer elements 1 and 2 or 8 and 9 may be replaced by the type employing a single magnetic core. Oscillators 4 and 11 may be replaced by a single oscillator driving both sets of magnetometer elements. Vacuum tubes 17 and 18 may be replaced by a single vacuum tube including a plurality of groups of electrodes within a single envelope.

In one successful embodiment of the invention, oscillators 4 and 11 operated at a frequency of 500 cycles per second and vacuum tubes 17 and 18 each comprised one half of a type 6H6 tube. The following values of resistors and capacitors were used:

| | | |
|---|---|---:|
| Capacitor 5 | microfarads | 1.0 |
| Capacitor 12 | do | 1.0 |
| Capacitors 22 | do | 80 |
| Resistors 19 and 23 | ohms | 1,000 |

| | | |
|---|---|---|
| Resistor 20 | do | 4,000 |
| Resistor 21 | do | 10,000 |

In actual tests of the successful embodiment described above, it was found that a change in the magnetic field intensity as great as 20,000 gammas produced a change at the detector of only approximately 10 gammas. It will be obvious, therefore, that without the compensation arrangement of the present invention, the detector would have to be capable of accommodating input signals having an extremely wide range of amplitude. As a result, the system would inherently be relatively insensitive to magnetic anomalies of the order of a few gammas.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for detecting magnetic anomalies wherein a second magnetometer mechanically coupled to the first or detecting magnetometer is used for control purposes comprising, first and second magnetometers, means for exciting the magnetometers, means for feeding back a portion of the output of the second magnetometer to said second magnetometer to compensate for the high-frequency response, and means for feeding a portion of said output to the first or detecting magnetometer to compensate for its low-frequency response.

2. Apparatus for detecting magnetic anomalies wherein a second magnetometer mechanically coupled to the detecting magnetometer is used for control purposes comprising in combination, a detecting magnetometer, a control magnetometer mechanically coupled thereto, means for filtering and rectifying the output of said control magnetometer, a feedback circuit constructed and arranged to feed back a portion of that output of said rectifier to said control magnetometer to compensate for the high-frequency response, and a circuit for feeding the rectified and filtered output of the control magnetometer to the detecting magnetometer to compensate for the low-frequency response.

3. In a first magnetometer constructed and arranged to be responsive to relatively rapid and slow changes in a magnetic field, means for substantially overcoming the effect on said response of relatively slow changes in said magnetic field, said means comprising a second magnetometer having a circuit to feed back a portion of its output to render an output signal which is a function of the slow changes in said magnetic field and connections for applying a portion of the output of said second magnetometer to said first magnetometer.

References Cited in the file of this patent

UNITED STATES PATENTS

| Number | Name | Date |
|---|---|---|
| 2,053,154 | La Pierre | Sept. 1, 1936 |
| 2,158,500 | Guerra | May 16, 1939 |
| 2,428,290 | Peck | Sept. 30, 1947 |
| 2,570,870 | Schmitt | Oct. 9, 1951 |